United States Patent
Shimanuki et al.

(10) Patent No.: US 9,941,545 B2
(45) Date of Patent: *Apr. 10, 2018

(54) ELECTROLYTE SOLUTION FOR SECONDARY BATTERIES, AND SECONDARY BATTERY USING SAME

(71) Applicant: NEC Corporation, Tokyo (JP)

(72) Inventors: Ikiko Shimanuki, Tokyo (JP); Hitoshi Ishikawa, Tokyo (JP); Daisuke Kawasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,763

(22) PCT Filed: Feb. 28, 2014

(86) PCT No.: PCT/JP2014/055179
§ 371 (c)(1),
(2) Date: Aug. 31, 2015

(87) PCT Pub. No.: WO2014/133169
PCT Pub. Date: Sep. 4, 2014

(65) Prior Publication Data
US 2016/0028118 A1    Jan. 28, 2016

(30) Foreign Application Priority Data
Mar. 1, 2013    (JP) ................ 2013-041320

(51) Int. Cl.
| H01M 10/0525 | (2010.01) |
| H01M 10/0567 | (2010.01) |
| H01M 10/052 | (2010.01) |
| H01M 2/02 | (2006.01) |
| H01M 4/38 | (2006.01) |
| H01M 4/485 | (2010.01) |
| H01M 4/587 | (2010.01) |
| H01M 10/0568 | (2010.01) |
| H01M 10/0569 | (2010.01) |
| H01M 4/02 | (2006.01) |

(52) U.S. Cl.
CPC ......... *H01M 10/0567* (2013.01); *H01M 2/02* (2013.01); *H01M 4/382* (2013.01); *H01M 4/485* (2013.01); *H01M 4/587* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2220/20* (2013.01); *H01M 2300/0025* (2013.01); *H01M 2300/0028* (2013.01); *Y02E 60/122* (2013.01); *Y02P 70/54* (2015.11); *Y02T 10/7011* (2013.01)

(58) Field of Classification Search
CPC ......... H01M 10/0567; H01M 10/0568; H01M 10/0569; H01M 10/0525
See application file for complete search history.

(56) References Cited

U.S. PATENT DOCUMENTS

| 2004/0043300 A1 | 3/2004 | Utsugi et al. |
| 2007/0111105 A1 | 5/2007 | Zaghib et al. |
| 2007/0148546 A1 | 6/2007 | Shimizu et al. |
| 2007/0154815 A1* | 7/2007 | Kawasaki ............. H01M 4/131 429/340 |
| 2007/0218365 A1 | 9/2007 | Takezawa et al. |
| 2008/0268347 A1 | 10/2008 | Ohzuku et al. |
| 2009/0123832 A1 | 5/2009 | Chigiri |
| 2009/0325074 A1 | 12/2009 | Fukumoto et al. |
| 2010/0297501 A1 | 11/2010 | Seki et al. |
| 2011/0248719 A1 | 10/2011 | Aoki |
| 2012/0255858 A1 | 10/2012 | Maeshima et al. |

(Continued)

FOREIGN PATENT DOCUMENTS

| CN | 102214826 A | 10/2011 |
| EP | 1394888 A1 | 3/2004 |

(Continued)

OTHER PUBLICATIONS

Machine translation of JP 2009-153118, published on Jul. 3, 2008 (Year: 2008).*
International Search Report corresponding to PCT/JP2014/055179, dated Apr. 15, 2014 (3 pages).
U.S. Office Action issued in corresponding U.S. Appl. No. 14/771,898, dated Nov. 23, 2016, 21 pages.
Japanese Office Action issued by the Japan Patent Office for Japanese Application No. 2015-503064 dated Dec. 5, 2017 (4 pages).

*Primary Examiner* — Anca Eoff
(74) *Attorney, Agent, or Firm* — Wilmer Cutler Pickering Hale and Dorr LLP

(57) ABSTRACT

Disclosed is an electrolyte solution for lithium secondary batteries, including a cyclic sulfonic acid ester represented by the general formula (1):

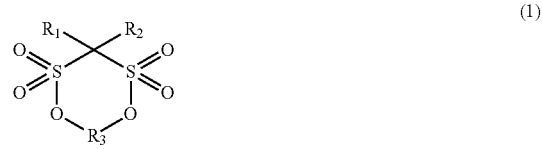

(1)

wherein, in the general formula (1), $R_1$ and $R_2$ each independently represent a hydrogen atom, an alkyl group having 1 to 5 carbon atoms, halogen or an amino group with the proviso that $R_1$ and $R_2$ do not represent hydrogen atoms at the same time; and $R_3$ represents methylene which may be substituted with fluorine. Batteries using this electrolyte solution are excellent in battery properties and storage characteristics.

6 Claims, 1 Drawing Sheet

(56) References Cited

U.S. PATENT DOCUMENTS

| | | | | |
|---|---|---|---|---|
| 2013/0011747 A1* | 1/2013 | Sasaki | ............... | C01B 31/02 |
| | | | | 429/336 |
| 2013/0029218 A1 | 1/2013 | Waki et al. | | |
| 2013/0059205 A1* | 3/2013 | Yamamura | ............ | H01M 4/134 |
| | | | | 429/231.8 |
| 2015/0349332 A1 | 12/2015 | Azami et al. | | |
| 2016/0020492 A1* | 1/2016 | Azami | ............... | H01M 4/587 |
| | | | | 429/327 |
| 2016/0028123 A1* | 1/2016 | Kawasaki | ............ | H01M 4/505 |
| | | | | 429/336 |

FOREIGN PATENT DOCUMENTS

| | | | |
|---|---|---|---|
| JP | 2004-185931 A | | 7/2004 |
| JP | 2004-281325 A | | 10/2004 |
| JP | 2004-281368 A | | 10/2004 |
| JP | 2005-222846 A | | 8/2005 |
| JP | 2006-278106 A | | 10/2006 |
| JP | 2008-153118 A | | 7/2008 |
| WO | WO-2011/096572 A1 | | 8/2011 |
| WO | WO 2011/115247 | * | 9/2011 |
| WO | WO 2011/118026 | * | 9/2011 |

* cited by examiner

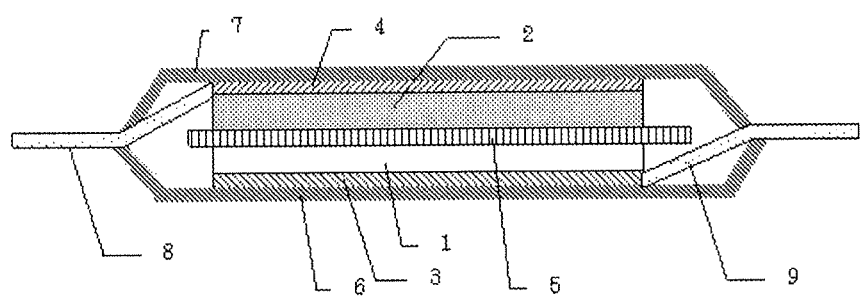

ELECTROLYTE SOLUTION FOR SECONDARY BATTERIES, AND SECONDARY BATTERY USING SAME

CROSS-REFERENCE TO RELATED APPLICATIONS

This application is a national stage application of International Application No. PCT/JP2014/055179 entitled "Electrolyte Solution for Secondary Batteries, and Secondary Battery Using Same," filed on Feb. 28, 2014, which claims priority to Japanese Patent Application No. 2013-041320, filed on Mar. 1, 2013, the disclosures of each which are hereby incorporated by reference in their entirety.

TECHNICAL FIELD

The present invention relates to an electrolyte solution for secondary batteries and a secondary battery using the same, and moreover, a battery for a vehicle including this secondary battery and a vehicle using the same. The present invention also relates to a method for producing the electrolyte solution for secondary batteries.

BACKGROUND ART

With the rapid expansion of the markets of, for example, notebook computers, cellular phones and electric vehicles, high-energy-density secondary batteries are demanded. Nonaqueous electrolyte solution lithium ion or lithium secondary batteries each using for the negative electrode thereof a carbon material, an oxide, a lithium alloy or lithium metal have been attracting attention because they are capable of realizing high energy density.

In the charge-discharge process of this secondary battery, the desorption and absorption reactions of lithium ions occur in the interface between the electrode and the electrolyte solution. Besides these reaction, the decomposition reactions of the electrolyte solution solvent and the supporting electrolyte salt take place to form a film having higher resistance on the electrode surface, which inhibits desorption and absorption reaction of lithium ions which should occur primarily. Consequently, for example, an irreversible degradation of the discharge capacity is promoted so as to lead to the degradation of the battery, and hence, various contrivances have been made in order to suppress such degradation.

As an example of such contrivances, there may be mentioned a method for suppressing the decomposition reactions by forming a protective film on the surface of the electrode, and as a mean thereof, there is proposed the addition of a cyclic disulfonic acid ester as an additive having a film forming ability to the electrolyte solution. For example, Patent Literature 1 and Patent Literature 2 disclose that the use of a cyclic disulfonic acid ester as an additive to the electrolyte solution forms a more stable film on the electrode surface than the use of a cyclic monosulfonic acid ester as an additive, leading to the improvement of the battery properties. Patent Literature 3 describes the improvement of the battery properties through the use of a cyclic or linear disulfonic acid ester having an unsaturated bond.

CITATION LIST

Patent Literature

Patent Literature 1: Japanese Patent Laid-Open No. 2004-281368
Patent Literature 2: Japanese Patent Laid-Open No. 2005-222846
Patent Literature 3: Japanese Patent Laid-Open No. 2004-281325

SUMMARY OF INVENTION

Technical Problem

However, an electrolyte solution containing an unsubstituted disulfonic acid ester, when being stored, undergoes degradations such as the coloration of the electrolyte solution, the generation of sediments in the electrolyte solution and increase of the free acid concentration. When such a degraded electrolyte solution is used, there arises a problem of the influence on the battery properties such as storage characteristics, in particular, of the reduction in the residual capacity associated with the self-discharge. When the unsubstituted disulfonic acid ester is used, sediments are generated, thereby the liquid injection nozzle is clogged in the production of the batteries, causing a problem that the production yield is low.

Accordingly, an object of the present invention is to provide an electrolyte solution for secondary batteries having excellent in storage characteristics, in particular, those having characteristics where the capacity decrease due to the self-discharge is suppressed.

Solution to Problem

The present invention relates to an electrolyte solution for lithium secondary batteries, including a cyclic sulfonic acid ester represented by the general formula (1):

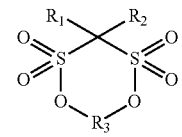

$$(1)$$

wherein, in the general formula (1), $R_1$ and $R_2$ each independently represent a hydrogen atom, an alkyl group having 1 to 5 carbon atoms, halogen or an amino group with the proviso that $R_1$ and $R_2$ do not represent hydrogen atoms at the same time; and $R_3$ represents methylene which may be substituted with fluorine.

Advantageous Effects of Invention

According to the present invention, there is provided an electrolyte solution for secondary batteries which can improve the battery properties and at the same time, excellent in storage characteristics.

BRIEF DESCRIPTION OF DRAWING

The FIGURE is a schematic structural view of the laminate outer package type structure of the nonaqueous electrolyte solution secondary battery of the present invention.

DESCRIPTION OF EMBODIMENTS

Hereinafter, the electrolyte solution for lithium secondary batteries according to an embodiment of the present invention and an example of the secondary batteries using the electrolyte solution are described.

<Nonaqueous Electrolyte Solution>

The electrolyte solution for lithium secondary batteries (hereinafter, sometimes simply referred to as a "nonaqueous electrolyte solution" or, simply an "electrolyte solution") in the present embodiment includes as an additive a cyclic sulfonic acid ester compound represented by the general formula (1) (hereinafter, sometimes simply referred to as a "compound of the general formula (1)");

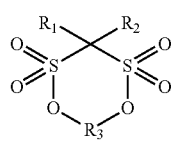

(1)

wherein in the general formula (1), $R_1$ and $R_2$ each independently represent a hydrogen atom, an alkyl group having 1 to 5 carbon atoms, halogen or an amino group with the proviso that $R_1$ and $R_2$ do not represent hydrogen atoms at the same time; and $R_3$ represents methylene which may be substituted with fluorine.

The cyclic sulfonic acid ester compound of the general formula (1) contained in the nonaqueous electrolyte solution is decomposed by the electrochemical redox reaction during charge-discharge reaction to form a film on the surface of the electrode active material, and accordingly can suppress the decomposition of the electrolyte solution and the supporting electrolyte salt. Accordingly, the cyclic sulfonic acid ester compound of the general formula (1) is considered to be effective in prolonging the life time of the lithium ion secondary battery. The present inventors made a diligent study in more detail on the lithium ion secondary battery comprising a nonaqueous electrolyte solution including a disulfonic acid ester compound, and have found that the electrolyte solution containing the compound of the general formula (1) has improved storage stability where the degradation is suppressed, and the use of the electrolyte solution remarkably improves the capacity maintenance, the storage characteristics, and in particular, the maintenance property of the residual capacity associated with the self-discharge of the lithium ion secondary battery.

The present inventors presume that the reason thereof is that when a specific position of the disulfonic acid ester has a substituent, specifically when at least one of $R_1$ and $R_2$ in the above general formula (1) is not a hydrogen atom, the reactivity of a decomposition product of the supporting electrolyte salt with the cyclic sulfonic acid ester decreases and the generation of free acids from the electrolyte solution can be suppressed. As shown in Examples described later, as compared with a sulfonic acid ester in which both of $R_1$ and $R_2$ are hydrogen atoms, the stability of the electrolyte solution was improved and the high-temperature storage characteristics of the battery were improved.

A compound in which at least one of $R_1$ and $R_2$ is an alkyl group is preferable, in particular, a compound in which one of $R_1$ and $R_2$ is an alkyl group and the other is a hydrogen atom, or both of $R_1$ and $R_2$ are alkyl groups is preferable, and a compound in which one of $R_1$ and $R_2$ is an alkyl group and the other is a hydrogen atom is most preferable. The reason a compound in which one of $R_1$ and $R_2$ is an alkyl group and the other is a hydrogen atom is most preferable is considered to be as follows. When at least one of $R_1$ and $R_2$ is not a hydrogen atom (namely, a group other than a hydrogen atom is included), the reactivity with the decomposition product of the supporting electrolyte salt decreases. However, when both of $R_1$ and $R_2$ are groups other than hydrogen atoms at the same time, the film forming ability of forming a film on the surface of the electrode active material is decreases, and the effect of prolonging the life time of the lithium ion secondary battery decreases.

Examples of the alkyl groups include methyl, ethyl, propyl, butyl and pentyl, and these may be either linear or branched. In particular, methyl, ethyl and propyl are preferable. $R_3$ is selected from methylene, monofluoromethylene and difluoromethylene.

In an embodiment of the present invention, the preferable compounds of the general formula (1) are represented by the general formulas (2) and (3).

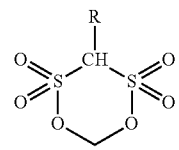

(2)

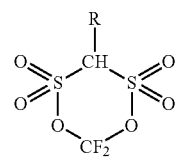

(3)

In the general formulae (2) and (3), R represents methyl, ethyl, propyl, butyl or pentyl.

The compounds of the general formula (1) may be used alone or in combinations of two or more thereof. Next, Table 1 shows typical examples of the compounds of the general formula (1), but the present invention is not limited to these.

TABLE 1

| Compound No. | Chemical structure |
|---|---|
| 1 | |
| 2 | |
| 3 | |

TABLE 1-continued

| Compound No. | Chemical structure |
|---|---|
| 4 | ![structure] |

The compounds of the general formula (1) can be obtained by using the production methods described in, for example, U.S. Pat. No. 49,050,768, and Japanese Patent Laid-Open Nos. S61-501089, H05-44946 and 2005-336155.

The proportion of the compound of the general formula (1) in the electrolyte solution is not particularly limited, but the compound is preferably included in a concentration of 0.005 to 10% by weight of the whole electrolyte solution. By setting the concentration of the compound represented by the general formula (1) to be 0.005% by weight or more, a sufficient filming effect can be obtained. The compound represented by the general formula (1) is more preferably added in a concentration of 0.01% by weight or more, and in this way, the battery properties can be further improved. By setting the concentration to be 10% by weight or less, the viscosity increase of the electrolyte solution and the resulting resistance increase can be suppressed. The compound is more preferably added in a concentration of 5% by weight or less, and in this way, the battery properties can further be improved.

The electrolyte solution of the present embodiment generally includes, but not particularly limited to, the compound of the general formula (1) as an additive, in addition to a nonaqueous solvent (aprotic solvent) and a supporting electrolyte salt.

As the supporting electrolyte salt, for example, a lithium salt can be used. Examples of the lithium salt include $LiPF_6$, lithium imide salt, $LiAsF_6$, $LiAlCl_4$, $LiClO_4$, $LiBF_4$ and $LiSbF_6$. Examples of the lithium imide salt include $LiN(C_kF_{2k+1}SO_2)(C_mF_{2m+1}SO_2)$ (in which, k and m are each independently a natural number and are each preferably 1 or 2.). These may be used alone or in combinations of two or more thereof.

The concentration of the lithium salt in the electrolyte solution is preferably 0.7 mol/L or more and 2.0 mol/L or less. By setting the concentration of the lithium salt to be 0.7 mol/L or more, a sufficient ionic conductivity is obtained. Also by setting the concentration of the lithium salt to be 2.0 mol/L or less, the viscosity can be decreased, and accordingly the migration of lithium ions is not hindered.

As the nonaqueous solvent, a solvent including at least one selected from the group consisting of cyclic carbonates, linear carbonates, aliphatic carboxylic acid esters, γ-lactones, cyclic ethers and linear ethers can be used. Examples of the cyclic carbonates include propylene carbonate (PC), ethylene carbonate (EC), butylene carbonate (BC), and the derivatives (inclusive of fluorinated compounds) of these. Examples of the linear carbonates include dimethyl carbonate (DMC), diethyl carbonate (DEC), ethyl methyl carbonate (EMC), dipropyl carbonate (DPC), and the derivatives (inclusive of fluorinated compounds) of these. Examples of the aliphatic carboxylic acid esters include methyl formate, methyl acetate, ethyl propionate, and the derivatives (inclusive of fluorinated compounds) of these. Examples of the γ-lactones include γ-butyrolactone and the derivatives (inclusive of fluorinated compounds) of this. Examples of the cyclic ethers include tetrahydrofuran, 2-methyltetrahydrofuran and the derivatives (inclusive of fluorinated compounds) of these. Examples of the linear ethers include 1,2-diethoxyethane (DEE), ethoxymethoxyethane (EME), ethyl ether, diethyl ether, and the derivatives (inclusive of fluorinated compounds) of these.

As the nonaqueous solvents, in addition to these, the following can also be used, such as dimethyl sulfoxide, formamide, acetamide, dimethyl formamide, dioxolane (for example, 1,3-dioxolane), acetonitrile, proppionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, 1,3-propanesultone, anisole, N-methylpyrrolidone, and the derivatives (inclusive of fluorinated compounds) of these.

The nonaqueous solvent particularly preferably includes at least one selected from the group consisting of cyclic carbonates, linear carbonates, aliphatic carboxylic acid esters, γ-lactones, cyclic ethers, linear ethers, and the fluorine derivatives of these compounds. The nonaqueous solvents may be used alone or in combinations of two or more thereof.

The electrolyte solution of the present embodiment may further include a compound having at least one sulfonyl group. Here, the compound having at least one sulfonyl group (hereinafter, also referred to as a sulfonyl group-containing compound) is a compound different from the cyclic sulfonic acid ester represented by the general formula (1). Some of the sulfonyl group-containing compounds may overlap with the foregoing nonaqueous solvents; however, the "sulfonyl group-containing compound" is usually used together with at least one nonaqueous solvent selected from the group consisting of cyclic carbonates, linear carbonates, aliphatic carboxylic acid esters, γ-lactones, cyclic ethers, linear ethers, and the fluorine derivatives of these compounds.

As the sulfonyl group-containing compound, the sultone compounds represented by the following general formula (4) are preferable.

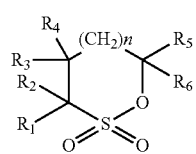

(4)

In the general formula (4), n represents an integer of 0 to 2, $R_1$ to $R_6$ each independently represent a hydrogen atom, an alkyl group having 1 to 12 carbon atoms, a cycloalkyl group having 3 to 6 carbon atoms, or an aryl group having 6 to 12 carbon atoms.

Examples of the compounds represented by the general formula (4) include cyclic sulfonic acid esters such as 1,3-propanesultone (PS), 1,4-butanesultone and 1,3-prop-2-enesultone.

The sulfonyl group-containing compound is used in a concentration of 0.005 to 10% by weight of the whole electrolyte solution.

The electrolyte solution of the present embodiment may further include vinylene carbonate or a derivative thereof. Examples of the vinylene carbonate or the derivative thereof may include vinylene carbonates such as vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate and 4,5-diphenylvinylene carbonate; and vinylalkylene carbonates such as vinylethylene carbonate (VEC) and divinylethylene carbonate.

Vinylene carbonate or the derivative thereof is used in a concentration of 0.005 to 10% by weight of the whole electrolyte solution.

In the present embodiment, other additives other than the foregoing compounds may also be included in the electrolyte solution, if necessary. Examples of the other additives include an overcharge-preventing agent and a surfactant.

<Negative Electrode>

The negative electrode can be prepared by forming a negative electrode active material layer including a negative electrode active material and a negative electrode binder on a negative electrode current collector. In the nonaqueous electrolyte solution secondary battery of the FIGURE, as the negative electrode active material used for the layer 2 including the negative electrode active material, one or two or more materials selected from the group consisting of lithium metal, a lithium alloy and a material capable of absorbing and desorbing lithium can be used, for example. Examples of the material capable of absorbing and desorbing lithium ion include carbon materials and oxides.

As the carbon material, lithium-absorbing materials such as graphite, amorphous carbon, diamond-like carbon and carbon nanotube, and the composite oxides of these can be used. Among these, the carbon material is preferably a graphite material or amorphous carbon. In particular, the graphite material is preferable because it is high in electron conductivity, is excellent in the adhesiveness with the current collector made of a metal such as copper and in the voltage flatness, contains small amount of impurities because of being formed at a high processing temperature, and thus is advantageous for the improvement of the negative electrode performances.

Examples of the oxide include silicon oxide, tin oxide, indium oxide, zinc oxide, lithium oxide, phosphorus oxide (phosphoric acid), boron oxide (boric acid), and the composite products of these. In particular, it is preferable to include silicon oxide. As the structure, an amorphous state is preferable. This is because silicon oxide is stable and does not cause reaction with other compounds, and the amorphous structure does not lead to the degradation due to the nonuniformities such as grain boundary and defects. As the film formation method, methods such as a vapor deposition method, a CVD method, a sputtering method and the like can be employed.

A lithium alloy is constituted with lithium and a metal capable of forming an alloy with lithium. The lithium alloy is constituted with, for example, a binary alloy or a ternary or higher-order alloy composed of a metal such as Al, Si, Pb, Sn, In, Bi, Ag, Ba, Ca, Hg, Pd, Pt, Te, Zn and La, and lithium. As the lithium metal and the lithium alloy, amorphous materials are particularly preferable. This is because amorphous structure causes less degradation resulting from the nonuniformities such as grain boundary and defects. Lithium metal or a lithium alloy can be formed by an appropriate method such as a melt cooling method, a liquid quenching method, an atomizing method, a vacuum vapor deposition method, a sputtering method, a plasma CVD method, a light CVD method, a heat CVD method, or a sol-gel method.

As the negative electrode binder, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide and the like can be used. The amount of the negative electrode binder to be used is preferably 0.5 to 25 parts by mass in relation to 100 parts by mass of the negative electrode active material, from the viewpoint of "sufficient binding strength" and "achievement of high energy" being in a trade-off relation with each other.

As the negative electrode current collector, aluminum, nickel, copper, silver, and alloys of these are preferable from the viewpoint of the electrochemical stability. Examples of the shape of the negative electrode current collector include foil, flat plate and mesh.

Examples of the method for forming the negative electrode active material layer include a doctor blade method, a die coater method, a CVD method and a sputtering method. After the negative electrode active material layer is formed beforehand, the negative electrode collector may also be formed by forming a thin film of aluminum, nickel or an alloy of these on the negative electrode active material layer by a method such as vapor deposition or sputtering.

<Positive Electrode>

In the secondary battery of the FIGURE, examples of the positive electrode active material used for the layer 1 including the positive electrode active material include lithium-containing composite oxides such as $LiCoO_2$, $LiNiO_2$ and $LiMn_2O_4$. The positive electrode active material may also be the compounds in which the transition metal fractions in these lithium-containing composite oxides is replaced with other metals. Lithium-containing composite oxides having a plateau at 4.2 V or more at a metal lithium counter electrode potential can also be used. Examples of the lithium-containing composite oxides include spinel type lithium manganese composite oxides, olivine-type lithium-containing composite oxides and inverse spinel-type lithium-containing composite oxides. Examples of the lithium-containing composite oxides include a compound represented by the following formula (4):

$$Li_a(M_xMn_{2-x})O_4 \quad (4)$$

wherein, in formula (4), $0<x<2$ and $0<a<1.2$; and M is at least one selected from the group consisting of Ni, Co, Fe, Cr and Cu.

As the positive electrode binder, the same binders as the negative electrode binders can be used. Among these, from the viewpoint of versatility or low cost, polyvinylidene fluoride is preferable. The amount of the positive electrode binder to be used is preferably 2 to 10 parts by mass in relation to 100 parts by mass of the positive electrode active material, from the viewpoint of the binding strength and energy density being in a trade-off relation with each other.

Examples of the binder other than polyvinylidene fluoride (PVdF) include vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide.

As the positive electrode current collector, aluminum, nickel, silver, and alloys of these are preferable. Examples of the shape thereof include foil, flat plate and mesh.

The positive electrode can be obtained, for example, by dispersing and kneading active materials together with an electrically conductive substance such as carbon black and a binder such as polyvinylidene fluoride (PVDF) in a solvent such as N-methyl-2-pyrrolidone (NMP), and applying the resulting mixture to the positive electrode current collector such as aluminum foil.

<Structure and Production Method of Secondary Battery>

The secondary battery using the nonaqueous electrolyte solution of the present embodiment has, for example, the structure as shown in the FIGURE. A positive electrode is formed by forming the layer 1 including a positive electrode active material as a film on the positive electrode current collector 3, and a negative electrode is formed by forming the layer 2 including a negative electrode active material as a film on the negative electrode current collector 4. These positive electrode and negative electrode are disposed so as to face each other with a porous separator 5 between them. The porous separator 5 is disposed so as to be nearly parallel to the layer 2 including the negative electrode active material. In the secondary battery, an electrode element having these positive electrode and negative electrode disposed so as to face each other and an electrolyte solution are housed in the outer packages 6 and 7. The positive electrode tab 9 is connected to the positive electrode current collector 3, the negative electrode tab 8 is connected to the negative electrode current collector 4, and these tabs are disposed so as to extend outward from the package. Examples of the shape of the nonaqueous electrolyte solution secondary battery of the present embodiment include, without being particularly limited to, a laminate outer package type, a cylinder type, a square type and a coin type.

As an example of a method for producing a secondary battery, the method for producing the secondary battery of the FIGURE is described. In a dry air or inert gas atmosphere, a negative electrode and a positive electrode are laminated with the porous separator 5 between them or the thus obtained laminate is further wound, and the resultant is housed in a battery can or an outer package formed of, for example, a flexible film made of a laminate composed of a synthetic resin and a metal foil, and then a nonaqueous electrolyte solution is impregnated. An excellent film can be formed on the negative electrode by performing charging of the nonaqueous electrolyte solution secondary battery before or after the sealing of the outer package. As the porous separator 5, porous films of polyolefins such as polypropylene and polyethylene, fluororesins, and the like are used. As the outer package, any outer package can be appropriately selected as long as it is stable against the electrolyte solution and has a sufficient water vapor barrier property. For example, in the case of a layered laminate type secondary battery, a laminate film such as polypropylene and polyethylene coated with aluminum or silica can be used as the outer package. In particular, it is preferable to use an aluminum laminate film from the viewpoint of suppressing the volume expansion.

EXAMPLES

Hereinafter, the present embodiment is described more specifically by way of Examples; however, the present invention is not limited to these Examples.

Example 1

(Preparation of Battery)

The preparation of the battery of the present Example is described. As the positive electrode current collector, a 20 μm-thick aluminum foil was used, and as the positive electrode active material, $LiMn_2O_4$ was used. As the negative electrode current collector, a 10 μm-thick copper foil was used, and as the negative electrode active material, graphite was used on the copper foil. The negative electrode and the positive electrode were laminated on each other interposing a separator made of polyethylene between them to prepare a secondary battery.

(Preparation of Nonaqueous Electrolyte Solution)

As the solvent for the nonaqueous electrolyte solution, a mixed solvent (volume ratio: EC/DEC=30/70) of EC and DEC was used, and $LiPF_6$ was dissolved as a supporting electrolyte salt in the nonaqueous electrolyte solution so as for the concentration thereof to be 1 M.

As an additive, Compound No. 1 in Table 1 presented above was added to the nonaqueous electrolyte solution so as to be included in a concentration of 0.1 mol/L. A nonaqueous secondary battery was prepared by using this nonaqueous electrolyte solution, and the storage test of the battery was performed. The storage test of the electrolyte solution was also performed by using this nonaqueous electrolyte solution.

(Battery Storage Test)

First, at room temperature, charging and discharging were performed once. The conditions of this case were set such that the CCCV charging rate was 1.0 C, the CC discharging rate was 1.0 C, the charging termination voltage was 4.2 V, and the discharging termination voltage was 3.0 V. Subsequently, each of the batteries was charged to a CCCV charging rate of 1.0 C, a charging termination voltage of 4.2 V for 2.5 hours, and then allowed to stand in a thermostatic bath set at 45° C. for four weeks. After being allowed to stand, discharging was performed at a CC discharging rate of 1.0 C, and the residual capacity was determined. The results thus obtained are shown in Table 3.

The storage test of an electrolyte solution was performed as follows. The electrolyte solution was placed in a Teflon bottle, capped tightly, and then the Teflon bottle was placed in a laminate and sealed, and stored in a thermostatic bath set at 45° C. for four weeks. The amount of the free acid in the electrolyte solution after storage was measured by neutralization titration. The results thus obtained are shown in Table 2. The Hazen value after storage was visually measured. The results thus obtained are shown in Table 2.

Examples 2 to 4

In each of Examples 2 to 4, a secondary battery was prepared in the same manner as in Example 1 except that the compound shown in Table 2 was used in place of Compound No. 1 in Example 1, and the properties of the battery, and the free acid amount, the Hazen value and the occurrence-nonoccurrence of turbidity in the electrolyte solution were examined in the same manner as in Example 1. The results thus obtained are shown in Tables 2 and 3.

Comparative Example 1

A secondary battery was prepared in the same manner as in Example 1 except that methylenemethane disulfonic acid ester (hereinafter, referred to as "Compound A1") was used in place of Compound No. 1 in Example 1, and the properties of the battery were measured in the same manner as in Example 1. The free acid amount, the Hazen value and the occurrence-nonoccurrence of turbidity in the electrolyte solution were also examined. The results are shown in Tables 2 and 3.

Comparative Example 2

A secondary battery was prepared in the same manner as in Example 1 except that the additive used in Example 1 was not added, and the properties of the battery were examined in the same manner as in Example 1. The results thus obtained are shown in Table 2.

TABLE 2

| | Additive | Free acid concentration before storage | Hazen after storage at 45° C. for 4 weeks | Occurrence-nonoccurrence of turbidity after storage at 45° C. for 4 weeks | Free acid concentration after storage at 45° C. for 4 weeks (PPM) |
|---|---|---|---|---|---|
| Example 1 | Compound NO. 1 | 20 | 40 | Not found | 93 |
| Example 2 | Compound NO. 2 | 22 | 80 | Not found | 115 |
| Example 3 | Compound NO. 3 | 23 | 60 | Not found | 104 |
| Example 4 | Compound NO. 4 | 19 | 60 | Not found | 100 |
| Comparative Example 1 | Compound A1 | 33 | >500 | Found | 309 |
| Comparative Example 2 | — | 10 | 10 | Not found | 40 |

In each of Examples and Comparative Examples, the solvent used was EC/DEC = 3/7 (volume ratio) and the supporting electrolyte salt used was $LiPF_6$ (concentration in electrolyte solution: 1M).

TABLE 3

| | Negative electrode active material | Additive | Residual capacity ratio (%) (Residual capacity after storage/capacity before storage) |
|---|---|---|---|
| Example 1 | Graphite | Compound No. 1 | 82.3 |
| Example 2 | Graphite | Compound No. 2 | 77.7 |
| Example 3 | Graphite | Compound No. 3 | 81.7 |
| Example 4 | Graphite | Compound No. 4 | 79.9 |
| Comparative Example 1 | Graphite | Compound A1 | 50.9 |
| Comparative Example 2 | Graphite | — | 20.0 |

In each of Examples and Comparative Examples, the negative electrode active material used was graphite, the solvent used was EC/DEC = 3/7 (volume ratio) and the supporting electrolyte salt used was $LiPF_6$ (concentration in electrolyte solution: 1M).

As shown in Table 2, it is confirmed that in the batteries shown in Examples 1 to 4, the residual capacity ratio after the storage test was increased, namely, the storage characteristics was improved, as compared with Comparative Examples 1 and 2. It is also confirmed that in the electrolyte solutions shown in Examples 1 to 4, the increase of the amount of the free acid was suppressed as compared with Comparative Example 1. Moreover, the electrolyte solutions shown in Examples 1 to 4 were free from the occurrence of the sediments, and are excellent in the actual production because the problem of clogging in the liquid injection nozzle does not occur.

Example 5

A secondary battery was prepared in the same manner as in Example 1 except that amorphous carbon was used in place of graphite in Example 1, and the main solvent of the electrolyte solution was PC/EC/DEC (volume ratio: 20/20/60), and the properties of the battery, and the free acid amount, the Hazen value and the occurrence-nonoccurrence of turbidity in the electrolyte solution were examined in the same manner as in Example 1. The results thus obtained are shown in Tables 4 and 5.

Examples 6 to 8

A secondary battery was prepared in the same manner as in Example 5 except that the compound shown in Table 4 was used in place of Compound No. 1 in Example 5, and the properties of the battery, and the free acid amount, the Hazen value and the occurrence-nonoccurrence of turbidity in the electrolyte solution were examined in the same manner as in Example 1.

Comparative Example 3

A secondary battery was prepared in the same manner as in Example 5 except that methylenemethane disulfonic acid ester (hereinafter, referred to as "Compound A1") was used in place of Compound No. 1 in Example 5, and the properties of the battery, and the free acid amount, the Hazen value and the occurrence-nonoccurrence of turbidity in the electrolyte solution were examined in the same manner as in Example 1.

Comparative Example 4

A secondary battery was prepared in the same manner as in Example 5 except that the additive used in Example 5 was not added. Subsequently, the properties of the battery were examined in the same manner as in Example 1. The results thus obtained are shown in Table 5.

TABLE 4

| | Additive | Free acid concentration before storage | Hazen after storage at 45° C. for 4 weeks | Occurrence-nonoccurrence of turbidity after storage at 45° C. for 4 weeks | Free acid concentration after storage at 45° C. for 4 weeks (PPM) |
|---|---|---|---|---|---|
| Example 5 | Compound NO. 1 | 22 | 60 | Not found | 100 |
| Example 6 | Compound NO. 2 | 24 | 40 | Not found | 123 |
| Example 7 | Compound NO. 3 | 26 | 60 | Not found | 107 |
| Example 8 | Compound NO. 4 | 21 | 80 | Not found | 111 |

TABLE 4-continued

| | Additive | Free acid concentration before storage | Hazen after storage at 45° C. for 4 weeks | Occurrence-nonoccurrence of turbidity after storage at 45° C. for 4 weeks | Free acid concentration after storage at 45° C. for 4 weeks (PPM) |
|---|---|---|---|---|---|
| Comparative Example 3 | Compound A1 | 36 | >500 | Found | 330 |
| Comparative Example 4 | — | 10 | 10 | Not found | 38 |

In each of Examples and Comparative Examples, the solvent used was PC/EC/DEC = 2/2/4 (volume ratio) and the supporting electrolyte salt used was LiPF$_6$ (concentration in electrolyte solution: 1M)

TABLE 5

| | Negative electrode active material | Additive | Residual capacity ratio (%) (Residual capacity after storage/capacity before storage) |
|---|---|---|---|
| Example 5 | Amorphous carbon | Compound No. 1 | 84.0 |
| Example 6 | Amorphous carbon | Compound No. 2 | 86.4 |
| Example 7 | Amorphous carbon | Compound No. 3 | 82.1 |
| Example 8 | Amorphous carbon | Compound No. 4 | 80.8 |
| Comparative Example 3 | Amorphous carbon | Compound A1 | 63.9 |
| Comparative Example 4 | Amorphous carbon | — | 42 |

In each of Examples and Comparative Examples, the negative electrode active material used was amorphous carbon, the solvent used was PC/EC/DEC = 2/2/4 (volume ratio) and the supporting electrolyte salt used was LiPF$_6$ (concentration in electrolyte solution: 1M).

It is confirmed that in the batteries shown in Examples 5 to 8, the residual capacity ratio after the storage test was increased, namely, the storage characteristics was improved, as compared with Comparative Examples 3 and 4. It is also confirmed that in the electrolyte solutions shown in Examples 5 to 8, the increase of the amount of the free acid was suppressed as compared with Comparative Examples 3 and 4. Moreover, the electrolyte solutions shown in Examples 5 to 8 were free from the occurrence of the sediments, and are excellent in the actual production because the problem of the clogging in the liquid injection nozzle does not occur.

INDUSTRIAL APPLICABILITY

Examples of the application of the present invention include driving devices such as electric vehicles, hybrid electric vehicles, electric motorcycles and electric power-assisted bicycles; tools such as electric tools; electronic devices such as portable terminals and notebook personal computers; and storage batteries for household electricity storage systems and solar power generation systems.

EXPLANATION OF SYMBOLS

1: positive electrode active material layer
2: negative electrode active material layer
3: positive electrode current collector
4: negative electrode current collector
5: porous separator
6: laminate outer package
7: laminate outer package
8: negative electrode tab
9: positive electrode tab

The invention claimed is:

1. A lithium secondary battery comprising a positive electrode, a negative electrode, and an electrolyte solution, wherein the electrolyte solution comprises a nonaqueous solvent at least selected from the group consisting of cyclic carbonates, linear carbonates, aliphatic carboxylic acid esters, γ-lactones, cyclic ethers, linear ethers and the fluorine derivatives of these compounds;

one or more materials as lithium salt, selected from the group consisting of LiPF$_6$, LiBF$_4$, LiAsF$_6$, LiSbF$_6$, LiClO$_4$, LiAlCl$_4$, and LiN(C$_n$F$_{2n+1}$SO$_2$)(C$_m$F$_{2m+1}$SO$_2$), in which n and m are natural numbers; and additive(s) consisting of:

(i) a cyclic sulfonic acid ester represented by Compound No. 1:

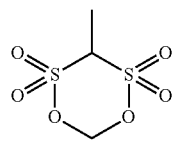

Compound No. 1

(ii) optionally, a sultone compound represented by the following general formula (4):

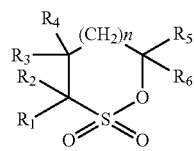

(4)

wherein in the general formula (4), n represent an integer of 0 to 2, R$_1$ to R$_6$ each independently represent a hydrogen atom, an alkyl group having 1 to 12 carbon atoms, a cycloalkyl group having 3 to 6 carbon atoms or an aryl group having 6 to 12 carbon atoms;

(iii) optionally, a vinylene carbonate or a derivative thereof; and (iv) optionally, an overcharge-preventing agent and/or a surfactant;

wherein the negative electrode comprises graphite as a negative electrode active material; and wherein the positive electrode comprises a lithium-containing composite oxide as a positive electrode active material.

2. The secondary battery according to claim 1, wherein the cyclic sulfonic acid ester represented by Compound No. 1 is included at a proportion of 0.005% by weight to 10% by weight based on the total mass of the electrolyte solution.

3. The secondary battery according to claim 1, comprising a film outer package.

4. A battery for a vehicle comprising the secondary battery according to claim 1.

5. A vehicle comprising the battery for a vehicle according to claim 4.

6. A method for producing a lithium secondary battery comprising a positive electrode, a negative electrode, and an electrolyte solution, comprising:

preparing the electrolyte solution by dissolving additive(s) consisting of:

(i) a cyclic sulfonic acid ester represented by Compound No. 1 and a supporting electrolyte salt in a nonaqueous solvent;

Compound No. 1

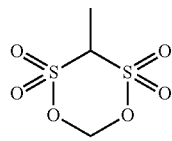

(ii) optionally, a sultone compound represented by the following general formula (4):

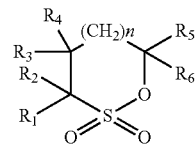

(4)

wherein in the general formula (4), n represents an integer of 0 to 2, $R_1$ to $R_6$ each independently represent a hydrogen atom, an alkyl group having 1 to 12 carbon atoms, a cycloalkyl group having 3 to 6 carbon atoms or an aryl group having 6 to 12 carbon atoms;

(iii) optionally, a vinylene carbonate or a derivative thereof; and (iv) optionally, an overcharge-preventing agent and/or a surfactant; and one or more materials as lithium salt, selected from the group consisting of $LiPF_6$, $LiBF_4$, $LiAsF_6$, $LiSbF_6$, $LiClO_4$, $LiAlCl_4$, and $LiN(C_nF_{2n+1}SO_2)(C_mF_{2m+1}SO_2)$, in which n and m are natural numbers, in a nonaqueous solvent at least selected from the group consisting of cyclic carbonates, linear carbonates, aliphatic carboxylic acid esters, γ-lactones, cyclic ethers, linear ethers and the fluorine derivatives of these compounds; and assembling the lithium secondary battery using the prepared electrolyte solution, the positive electrode, and the negative electrode, wherein the negative electrode comprises graphite as a negative electrode active material; and wherein the positive electrode comprises a lithium-containing composite oxide as a positive electrode active material.

\* \* \* \* \*